(12) United States Patent
Fontanot

(10) Patent No.: US 8,428,760 B2
(45) Date of Patent: Apr. 23, 2013

(54) METHOD FOR SCHEDULING A PRODUCTION PROCESS BY SUPPORTING THE VISUALIZATION OF MATERIAL SHORTAGES

(75) Inventor: Paolo Fontanot, Monfalcone (IT)

(73) Assignee: Siemens Aktiengesellschaft, Munich (DE)

( * ) Notice: Subject to any disclaimer, the term of this patent is extended or adjusted under 35 U.S.C. 154(b) by 487 days.

(21) Appl. No.: 12/701,870

(22) Filed: Feb. 8, 2010

(65) Prior Publication Data

US 2010/0217419 A1 Aug. 26, 2010

(30) Foreign Application Priority Data

Feb. 25, 2009 (EP) .................... 09153610

(51) Int. Cl.
*G06F 19/00* (2011.01)
(52) U.S. Cl.
USPC .................... 700/100; 700/106; 345/440
(58) Field of Classification Search ........... 700/99–107; 345/440

See application file for complete search history.

(56) References Cited

U.S. PATENT DOCUMENTS

| | | | |
|---|---|---|---|
| 6,801,820 B1* | 10/2004 | Lilly et al. | 700/100 |
| 7,505,998 B2* | 3/2009 | Barrett | 1/1 |
| 7,904,192 B2* | 3/2011 | Chua et al. | 700/100 |
| 7,962,227 B2* | 6/2011 | Worek et al. | 700/16 |
| 2004/0119713 A1* | 6/2004 | Meyringer | 345/440 |
| 2005/0021164 A1* | 1/2005 | Surholt et al. | 700/106 |
| 2005/0137734 A1* | 6/2005 | Nieuwelaar et al. | 700/100 |
| 2008/0294279 A1* | 11/2008 | Tiozzo | 700/100 |
| 2010/0161366 A1* | 6/2010 | Clemens et al. | 705/8 |

OTHER PUBLICATIONS

European Search Report dated Aug. 6, 2009.

* cited by examiner

*Primary Examiner* — Jeffrey A Gaffin
*Assistant Examiner* — Douglas Lee
(74) *Attorney, Agent, or Firm* — Laurence A. Greenberg; Werner H. Stemer; Ralph E. Locher

(57) ABSTRACT

A method for scheduling a production process is disclosed, wherein a production order requiring components is placed on a production schedule, the availabilities of the components, which are required for the production order, are detected by a computing unit, production orders requesting one or more of the components are classified depending on the availabilities of the corresponding components, and the production order is displayed with a first optically observable marker if the order requests a missing component and/or produces a missing component.

14 Claims, 4 Drawing Sheets

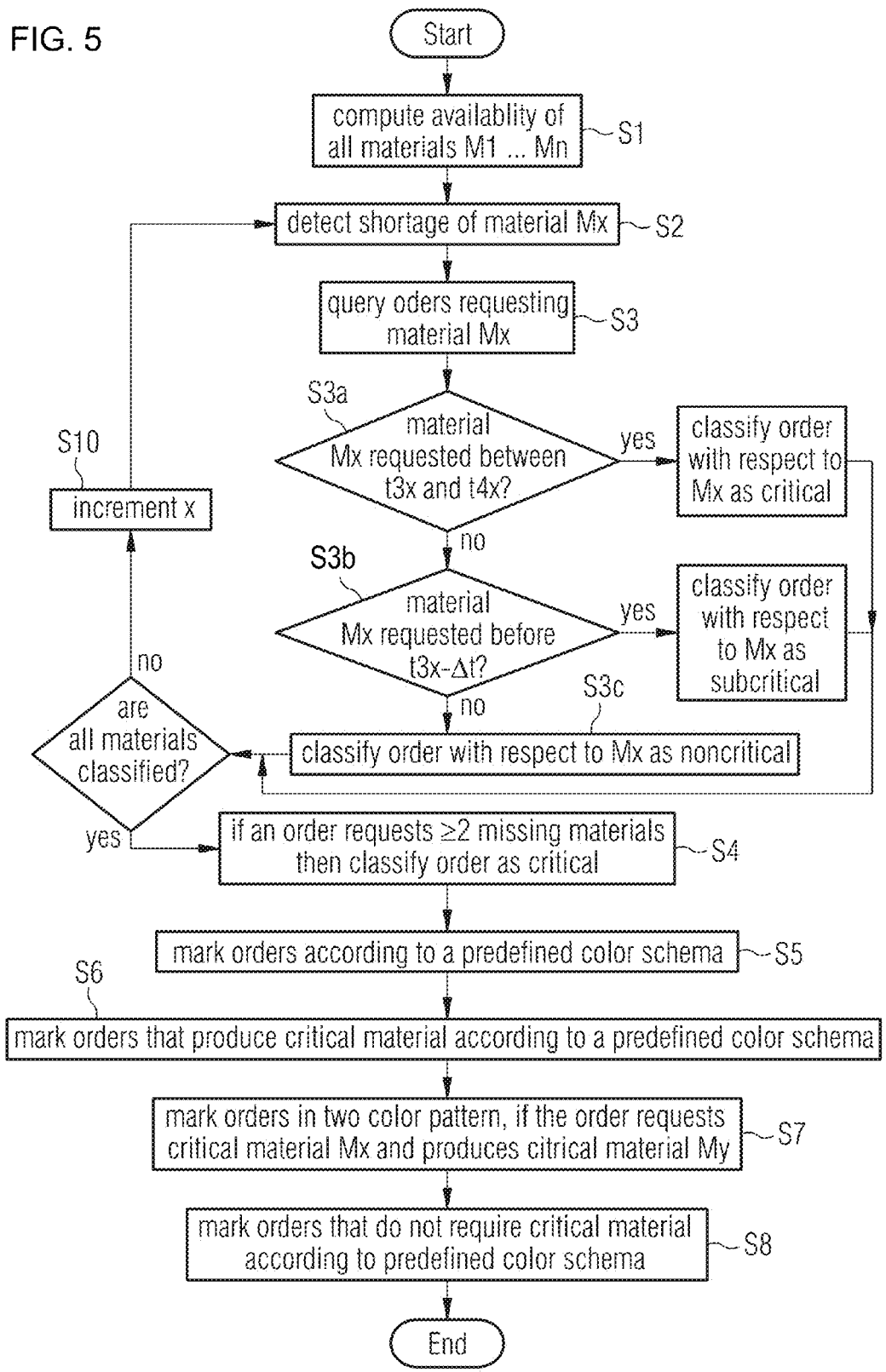

METHOD FOR SCHEDULING A PRODUCTION PROCESS BY SUPPORTING THE VISUALIZATION OF MATERIAL SHORTAGES

CROSS-REFERENCE TO RELATED APPLICATION

This application claims the priority, under 35 U.S.C. §119, of European Patent Application EP 0 915 3610, filed Feb. 25, 2009; the prior application is herewith incorporated by reference in its entirety.

BACKGROUND OF THE INVENTION

Field of the Invention

The present invention relates to a method for scheduling a production process.

A typical way to organize manufacturing activities is based on the concept of "work order." That is a logical entity structured to include all information required to manage a stage of production. Among such information, a work order has details about resulting items being produced (those can be finished products or intermediate materials), details about operations to be performed and details about resources to be used. Resources include equipments, personnel and materials.

Work orders are issued to meet demands originated by customers or by stock replenishment requests. A production plan with orders satisfying such a given set of production requests is feasible if all of the resource requirements for all of the operations to be performed by each work order are satisfied or can be met. Even if globally, a sufficient amount of resources is available, the feasibility of all operations cannot be guaranteed without a proper scheduling, because the temporal availability of resources has to be taken into account for each operation. Many different constraints and goals are to be simultaneously considered when building a production schedule and that usually makes the overall process of scheduling not a straightforward task. The complexity of that problem increases with the number of different products, resources and work orders to be taken into account. Usually, the task of building the production schedule is performed with the aid of a computer-based scheduling system.

Such a scheduling system includes a database containing the production data (that means information about all orders and resources to be managed), a computing engine implementing a set of scheduling functions and a graphical user interface that is commonly based on an interactive Gantt-chart.

The Gantt-chart is a type of bar chart and can be used to illustrate a project schedule. An example of a computer-based interactive Gantt-chart is depicted in FIG. 1. The Gantt-chart includes graphical objects, which are hereinafter also called rectangles or bars, that represent tasks which are part of the production schedule. Each row 1 to 11 of the Gantt-chart shows a timeline on the x-axis for a specific machine. Each colored rectangle represents a task that has been scheduled for being processed on a machine. The meaning of the coloring schema corresponds to a user choice. Each different color can represent different products or different tools or different production order code to facilitate user interactions with the object on the Gantt-chart. For example, in row 2 of the Gantt-chart, the timeline includes five rectangles wherein the first one is green G, the second one is blue B, the third one is green G, the fourth one is purple P, and the fifth one is yellow Y.

That gives the user the ability to display the resulting plan in graphical form on the Gantt-chart and in some cases to interactively institute changes to the production schedule. Such an interactive tool gives the user the ability to move the graphical objects on a screen through the use of a pointing device, for example a mouse, trackball or touch-screen.

A common issue in scheduling is that of dealing with missing materials. In order to begin an assembly operation, for example, it is required that some components together with the proper tools, equipment and personnel resources be simultaneously present at the point in time at which the operation starts. If an order supplying some of those components is delayed, all other resources involved in the assembly operation will be delayed waiting for the missing component. That problem is typical in the discrete manufacturing environment, that can easily suffer from jamming due to orders that get delayed waiting for some missing part: either a raw material, a component or an intermediate material (some subassembly, for example). In that case, an accurate and timely scheduling of material availability for each order and operation plays a major role in ensuring an acceptable level of production performance.

The method commonly used in production scheduling to deal with material issues is to simulate the availability over time for each material involved in the scheduled orders and operations. That is basically accomplished by scheduling software, with electronic computation of a "projected availability balance" for each material. An example thereof is depicted in FIG. 2. That balance is a function of time representing the future estimated availability for the material that is computed against all scheduled orders and operations which produce or consume the given material. The inventory value of such a function at the initial time t0 is equal to the "on hand" quantity corresponding to the current inventory level of the given material. Each other inventory value for t>t0 is computed by adding or subtracting the quantity produced or consumed at that time by each scheduled operation involving such material. When the inventory value or available quantity goes below zero, the algorithm predicts that a shortage for the given material will occur.

Different strategies are possible to solve the problem of managing shortages for each material requested by the orders and operations of the production schedule.

First Strategy:

For an already existing production schedule, the projected availability balance function is scanned, looking for shortages and a warning is issued when some material availability goes below zero. A user receiving such a warning will then try to manage the material issues by interactively instituting some changes to the schedule.

Second Strategy:

When building a new production schedule or updating an existing one, each order and operation are checked for material availability by comparing the operation's material requirements with the corresponding projected availability balances. In case of a shortage of one or more materials, the operation can be postponed on the schedule and/or highlighted (to be further spotted by the user) by scheduling algorithms used to create the resulting production plan. With such a production schedule, a user can look at those orders or operations with missing materials and then try to solve those issues by instituting some changes to the scheduling data before triggering the execution a partial or global rebuilding of the schedule.

The first strategy is adopted, for example, by the firm Siemens in the interactive scheduler of SIMATIC IT (a registered trademark of Siemens). Within that scheduling environment, the human user has full control of all scheduling actions through the use of an interactive user interface. The creation of the schedule is performed either manually (with the help of specific tools configured to speed-up that operation) or through the use of simple scheduling algorithms that are always executed under complete supervision of the user. At any time that a material shortage occurs, a specific warning is issued to the user. In order to solve that issue, after receiving the warning for a missing material, the user has to analyze the schedule in order to find out which operations are consuming or producing the missing material, then choose the ones that are most strictly related to the detected stock shortage and eventually postpone on the schedule those that are consuming that material and/or anticipate those that are producing it. That is done interactively by using graphical features of the user interface provided by the scheduling system. Such an approach works in principle, but its practical use can sometimes be cumbersome since the main focus of that strategy is on the material having a shortage, but the changes that the user must actually institute on the schedule are focused on the operations instead.

The second strategy is basically adopted by systems equipped with an automatic scheduling engine. From the user interaction perspective, those products are working as "black boxes" since no interaction occurs during the execution of the scheduling task performed by some automatic algorithm. The user can only examine the result after the schedule has been created or updated by the software. The scheduling engine operates by comparing a great number of alternative scheduling choices following some optimization strategy. For every order and operation of the production schedule, the algorithm checks the availability of resources and selects the best alternative according to the strategy of choice. Orders or operations with missing materials that are detected by the scheduler can be marked for further processing. For example, a graphical user interface of a scheduler by the firm Ortems has the possibility of highlighting with a different color such operations on the Gantt chart view. The user can then easily spot such orders and thus decide if some corrective action can be instituted on the schedule, for example moving them to postpone a material issue. The changes are made interactively by the user and the scheduling engine is run again to rebuild the schedule. A limitation of that method is that when orders are marked for a material issue, that feature only signals that there are some missing materials for the marked order but does not show if those materials are used by some other order and thus can be potentially countermanded in case of schedule modifications.

SUMMARY OF THE INVENTION

It is accordingly an object of the invention to provide a method for scheduling a production process by supporting the visualization of material shortages, which overcomes the hereinafore-mentioned disadvantages of the heretofore-known methods of this general type and which gives the user more information about the status of actual and future orders and operations.

With the foregoing and other objects in view there is provided, in accordance with the invention, a method for scheduling a production process. The method comprises placing a production order requiring components on a production schedule, detecting availabilities of the components required for the production order with a computing unit, classifying production orders requesting one or more of the components depending on the availabilities of the corresponding components, and displaying the production order with a first optically observable marker if the order requests a missing component and/or produces a missing component.

The method for scheduling a production process includes the following steps. In a first step, a production order requiring components is placed on a production schedule for visualizing the production process. In a second step, the availabilities of components, which are required for the production order, are detected through the use of a computing unit. In a third step, production orders requesting one or more of the components are classified depending on the availabilities of the corresponding components. In a forth step, the production order is displayed with a first optically observable marker in case the production order requests missing components and/or produces missing components.

In accordance with another mode of the method of the invention, preferably, the component is classified as being missing at a certain point in time, if the availability of the component lies at that point in time below a determined value.

In accordance with a further mode of the method of the invention, the order is classified as critical, if it requests at least one of the components which is missing at the point in time, at which it is requested.

In accordance with an added mode of the method of the invention, the order is classified as subcritical, if the order requests one of the components within a certain period of time before it is missing.

In accordance with an additional mode of the method of the invention, the order is classified as noncritical, if the order requests one of the components at a point in time, which lies before the point in time at which the period of time begins.

In accordance with yet another mode of the method of the invention, additionally, the optically observable marker is a multicolor bar.

In accordance with yet a further mode of the method of the invention, the bar includes a first triangular area with a first color and a second triangular bar with a second color.

In accordance with yet an added mode of the method of the invention, the order is displayed with a second optically observable marker, if the order is classified as critical.

In accordance with yet an additional mode of the method of the invention, advantageously, the order is displayed with a third optically observable marker, if the order is classified as noncritical.

In accordance with again another mode of the method of the invention, over and above, the order can be displayed with a fourth optically observable marker, if the order produces a missing component or components.

In accordance with again a further mode of the method of the invention, the component can, for example, be material, a tool, equipment or a personal resource.

In accordance with again an added mode of the method of the invention, the method can be used for a manufacturing execution system.

With the objects of the invention in view, there is also provided a computer program element, comprising computer program code for performing steps according to the above-mentioned method when loaded in a digital processor of a computing device.

With the objects of the invention in view, there is concomitantly provided a computer program product stored on a computer usable medium, comprising computer readable program code for causing a computing device to perform the method according to the invention.

Other features which are considered as characteristic for the invention are set forth in the appended claims.

Although the invention is illustrated and described herein as embodied in a method for scheduling a production process by supporting the visualization of material shortages, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 5 shows an example of a flow diagram of the method according to the invention for generating the bars in the Gantt-chart.

DETAILED DESCRIPTION OF THE INVENTION

Figure 2:
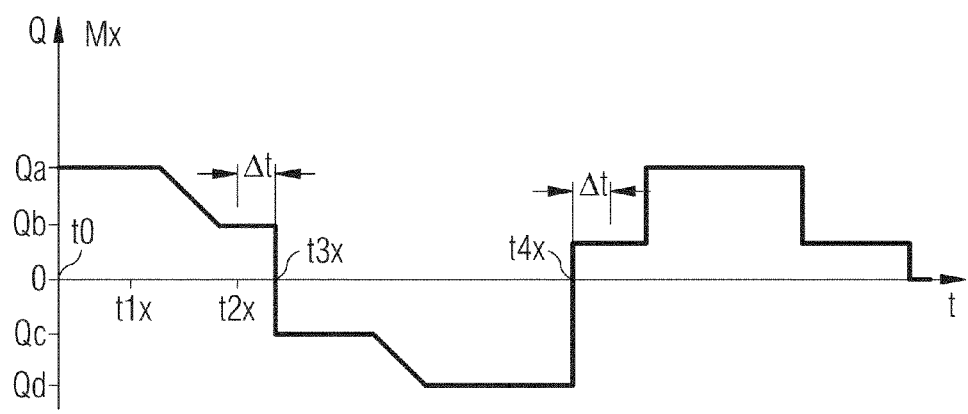
FIG. 2 shows an availability balance diagram for a determined material.

Referring now to the figures of the drawings in detail and first, particularly, to FIG. 2 thereof, there is seen an example of a projected availability balance diagram, or an availability diagram for short, for a material Mx, which is depicted therein. The material Mx is a determined input material from a set of input materials M1 to Mn, and is required for a determined order or operation. For the sake of simplicity and better understanding in the following, orders and operations are occasionally summarized under the expression orders. The x-axis of the availability balance diagram corresponds to the time t and the y-axis corresponds to the available quantity or inventory value Q of the material Mx. As can be seen from the course of the availability balance diagram at the points in time t0 and t1$x$, a determined quantity Qa of the material Mx is available. Later on the available quantity Q of the material Mx decreases to a value Qb. At a point in time t3$x$, the available quantity Q becomes negative and decreases to a value Qc. Later on the available quantity of the material Mx decreases even more and reaches a value Qd. At the point in time t4$x$, the available quantity Q increases and becomes a positive value Qb and later on Qa. This means, that one can assume that between the points in time t3$x$ and t4$x$ a shortage of material Mx will occur, i.e. that too little material Mx will be available or in other words material Mx is missing. This availability diagram can also be calculated through the use of a computing unit for another material My, or more generally for all input materials M1 to Mn. The computation algorithm is not restricted to compute the availability of materials, but can also be used to compute availability of any kind of components, such as tools, equipment, and personal resources.

For the sake of simplicity and better understanding in the following, the method is explained not with components but in an exemplary manner with materials.

Figure 3:
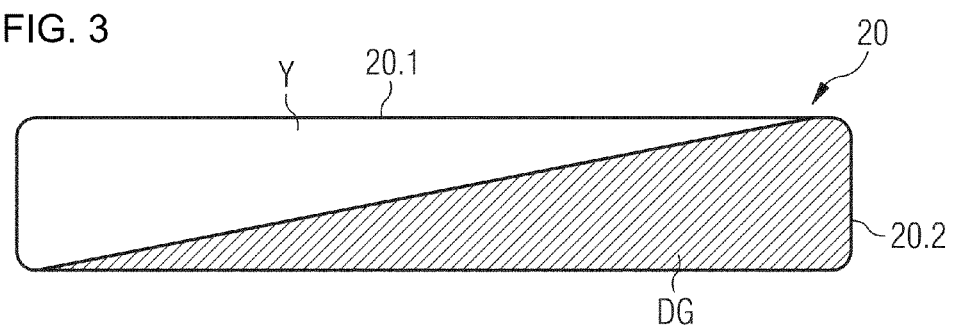
FIG. 3 shows a task represented with a multicolor bar for a Gantt-chart which has been created by the method according to the invention.
Figure 4:
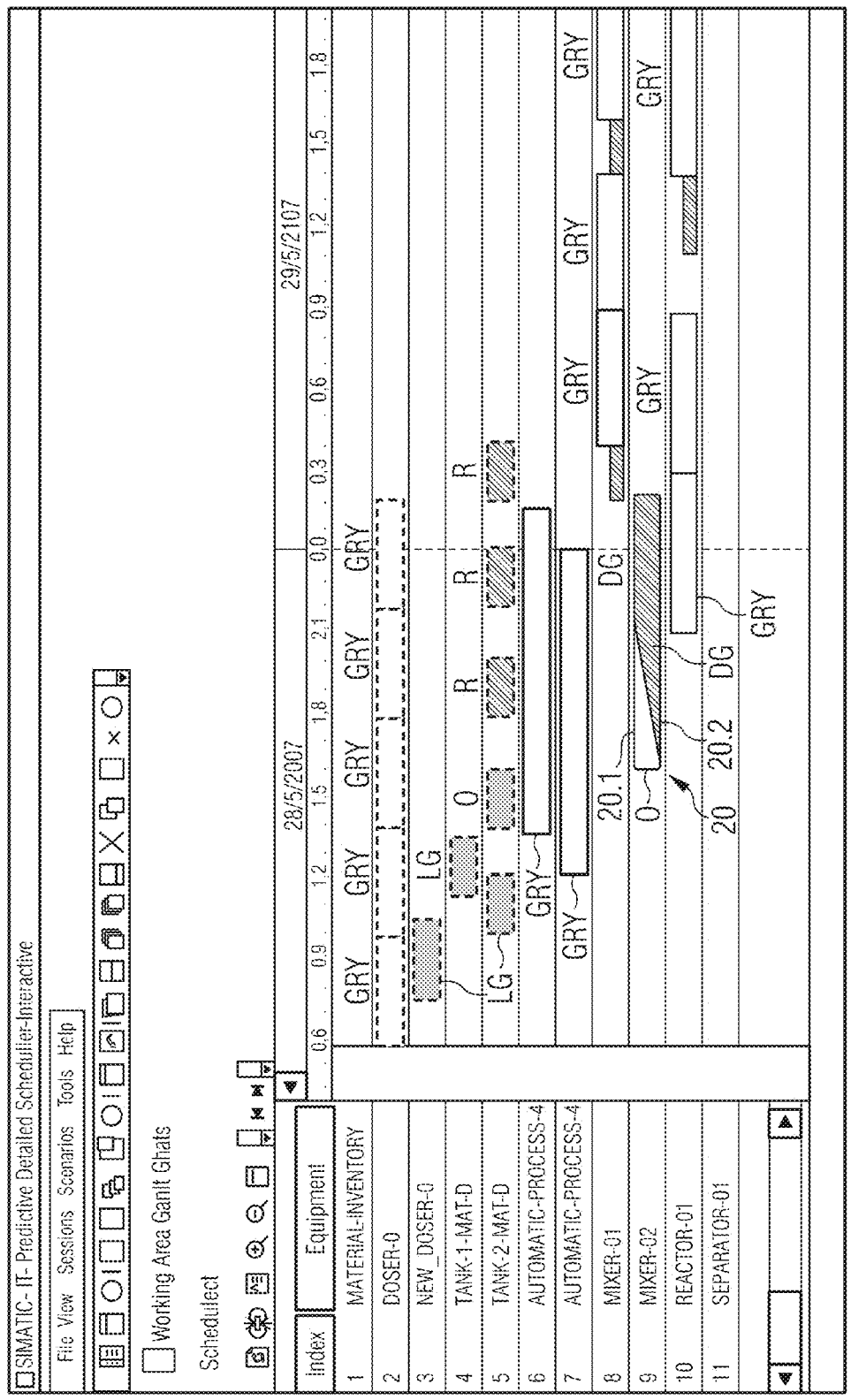
FIG. 4 shows an example of a computer-based interactive Gantt-chart which has been created by the method according to the invention.

The problem of dealing with the availability of materials M1 to Mn in an interactive scheduling environment can be solved by enhancing the above-mentioned first strategy with an interactive tool, that allows the direct visualization on the Gantt-chart of orders and operations with some missing material. This interactive tool or feature can be activated by the user by choosing an appropriate option to: "color by material shortage." As a result, the operations on the Gantt-chart will be automatically displayed using a coloring schema that reflects their status regarding the availability of the required input materials. Through the use of an optically observable marker, the status of a determined order or operation can be indicated and displayed on a screen. An example for such an optically observable marker is a multicolored bar 20 which is depicted in FIG. 3. The bar 20 is divided into two triangular areas 20.1 and 20.2. The area 20.1 is colorized yellow Y, and the area 20.2 is colorized dark green DG. An example of a Gantt-chart including such a bar is depicted in FIG. 4.

Advantageously, this feature does not have the limit (as in the above-mentioned second strategy) of showing only those orders with some missing materials: even orders that potentially can lead to a shortage because they need such materials are highlighted using this method or tool. This gives the user a direct perception of where on the Gantt-chart the material issues are located. When the user performs a corrective action by interactively moving orders or operations on the Gantt-chart, the tool automatically recomputes the material availability and the coloring schema immediately reflects the changed situation. The tool can then help the user in solving the material issues in a very intuitive way.

Basically, the "material shortage visualization" tool once activated works in the following way. FIG. 5 shows an example of a corresponding flow diagram related thereto, which shows how the method works in a simplified way.

Figure 1:
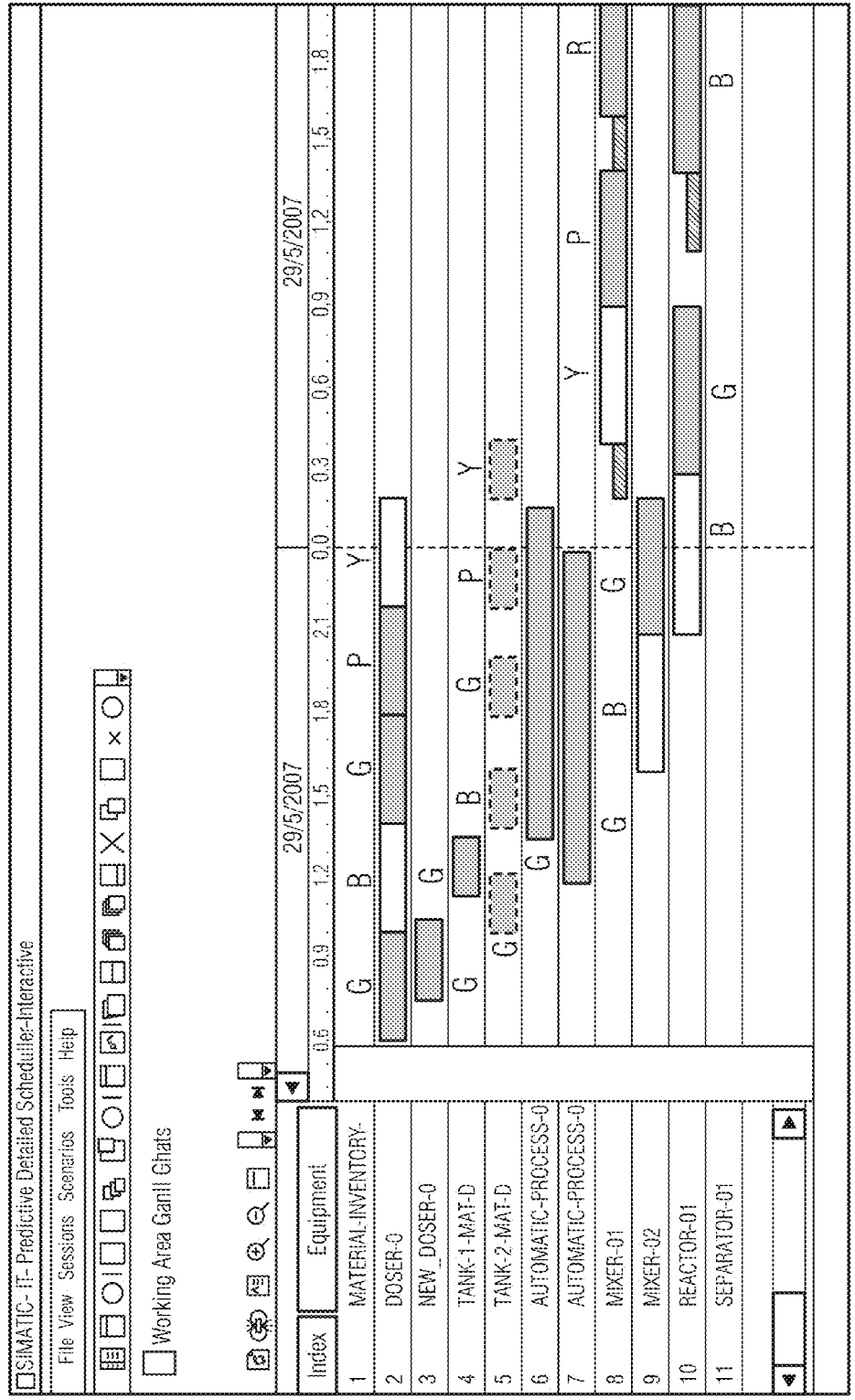
FIG. 1 shows an example of a computer-based interactive Gantt-chart according to the prior art.

First, a production order consuming an amount of one or more material M1 to Mn is placed on a production schedule, such as the Gantt-chart according to FIG. 1. The amount of the required material is associated with the production order. Based on this associated required material data, an automatic algorithm computes the availability balance for all materials M1 to Mn produced and/or consumed by the orders and operations of the production schedule. In the flow diagram according to FIG. 5, this corresponds to steps S1 and S10.

In a second step S2, the algorithm detects a material shortage when the material availability goes below zero. The data which are relevant for the detection of material shortage are the missing material Mx and the estimated start time t3$x$ of the shortage. If some orders produce the material Mx, it is possible for the projected availability balance for the material Mx to become positive again, thus ending the shortage at a point in time t4$x$ as is depicted in FIG. 2.

In a third step S3, the algorithm queries all orders and operations requesting the material Mx in an interval surrounding the points in time t3$x$ and t4$x$. The orders and operations are classified as in the following:

S3$a$: Orders and operations requesting the material Mx between the point in time t3$x$ and the point in time t4$x$ are considered to be "critical" with respect to the availability of the material Mx.

S3$b$: Orders and operations requesting the material Mx before the point in time t3$x$ but in a given short interval $\Delta t$ around t3$x$ (e.g. on the same day or in the same shift as t3$x$) or after the point in time t4$x$ but in a given short time interval $\Delta t$ around t4$x$, are considered to be "sub critical" with respect to the availability of the material Mx. The period of time or time interval $\Delta t$ is shown in FIG. 2. The point in time t2$x$ is the point in time at which the period of time $\Delta t$ begins, and t3$x$ is the point in time at which the period of time $\Delta t$ ends. As mentioned above, the period of time $\Delta t$ can also begin at the point in time t4$x$.

S3c: Orders and operations requesting the material Mx, and which were not already classified in steps S3a or S3b, are considered to be "non critical" with respect to the availability of the material Mx.

If shortages of different materials have been detected, the above classification step S3 is replicated for each missing material. In case the same order or operation is requesting more than one missing material, this classification is performed by assigning the worst case choice to the order or operation. This is done in a fourth step S4. For example, if the materials M1 and M2 are missing and the order consuming both materials M1 and M2 has been classified in step S3 as "sub critical" with respect to the material M1 but as "critical" with respect to the material M2, this order is considered to be "critical".

In a fifth step S5, orders and operations that consume some missing material are marked on the interactive Gantt-chart according to the following coloring schema:

5a: The "non critical" orders and operations are colored in dark green DG.

5b: The "sub critical" orders and operations are colored in orange O.

5c: The "critical" orders and operations are colored in red R.

In a sixth step S6, orders and operations that do not consume some missing material but are producing one or more of the missing materials are colored in dark green DG.

In a seventh step S7, orders and operations that are both consuming some missing material and producing some other missing material are displayed in a two-colored bar 20 as depicted in FIG. 3. The bar 20 is hereinafter also called a two-colored pattern. One part 20.1 of the bar 20 is colored according to step S5 and the other part 20.2 is colored according to step S6.

In an eighth step S8, orders and operations that do not consume or produce any critical material are colored in light grey GRY.

The color schema can be freely configured. The above-described color schema is just an example that can be used to visually represent the detected material issues on the Gantt-chart.

The user can choose whether the above-described procedure shall be activated for all materials, e.g. to highlight all material issues on the Gantt-chart, or whether the procedure shall be activated only for a single material. In the latter case, that can be useful to restrict the analysis for specific materials, the two color pattern of step S7 is not displayed.

The proposed tool gives the user, who performs or supervises the scheduling process, the advantage of a direct and intuitive way to identify material issues. These can be easily spotted on the Gantt-chart. The coloring schema distinguishing critical, sub critical issues together with operations consuming and producing critical materials, helps the user in choosing the best way to act on the production schedule to solve such issues. As a result, the task of scheduling and dealing with material issues is improved in speed and effectiveness.

It is possible that material issues cannot be completely resolved because the total demand for materials can sometimes exceed the currently available amount. It is important in such cases to have a clear and immediate view of where these issues are located on the production schedule in order to decide for corrective actions aimed at guaranteeing that as many operations as possible will be feasible without interruption. This tool greatly helps in having this kind of view.

Being directly highlighted, orders with some missing material are immediately detected by the user on the Gantt-chart without the need to focus outside of it. Moreover, orders that potentially can lead to a material issue are also highlighted. This helps the user to avoid having an attempt for a corrective action result in another new material issue.

The Gantt-chart according to FIG. 4 has colors set according to a schema that marks in red R the orders and operations requiring a missing material, in orange O those that potentially can suffer a material shortage, and in green G those requiring material without suffering from a shortage. Operations supplying that critical material are marked in dark green DG. The two-color pattern 20 is used for an operation that both consumes and produces critical material. The triangular part 20.1 which represents the consumption of critical material is displayed in orange O and the triangular part 20.2 which represents the production of critical material is displayed in dark green DG.

The method according to the invention can be implemented in or coupled with a Manufacturing Execution System (MES) which is a manufacturing management system that can be used to measure and control production activities. Some of the benefits with regard to MES solutions are increased traceability, productivity, and quality. Other functions served by MES solutions may include equipment tracking, product genealogy, labor tracking, inventory management, costing, electronic signature capture, defect and resolution monitoring, key performance indicator monitoring and alarming, executive dashboards and other various reporting solutions. MES operates a process near and is distinguished by the direct binding to automation and enables the control of production in real time. For this purpose, MES includes data acquisition and data preparation such as factory data capture, machine data logging and personnel data acquisition, and in addition, all other processes, which have a time near effect on the manufacturing/production process. The term MES usually refers to an overall system, which covers the range between the Enterprise Resource Planning (ERP) of the enterprise guidance level and the actual manufacturing and/or production process in the manufacturing and/or automation level.

Having illustrated and described a preferred embodiment for a novel method for visualizing a production schedule, it is noted that variations and modifications in the method can be made without departing from the spirit of the invention and lie within the scope of the appended claims.

The invention claimed is:

1. A method for scheduling a production process, the method comprising the following steps:
   placing a production order requiring components on a production schedule;
   detecting availabilities of the components required for the production order with a computing unit;
   classifying production orders requesting one or more of the components depending on the availabilities of the corresponding components; and
   displaying the production order with a first optically observable marker if the order requests a missing component and/or produces a missing component.

2. The method according to claim 1, which further comprises classifying the component as being missing at a certain point in time, if the availability of the component lies below a determined value at the certain point in time.

3. The method according to claim 1, which further comprises classifying the order as critical, if it requests at least one of the components which is missing at a point in time at which it is requested.

4. The method according to claim 1, which further comprises classifying the order as subcritical, if the order requests one of the components within a certain period of time before it is missing.

5. The method according to claim 4, which further comprises classifying the order as noncritical, if the order requests one of the components at a point in time before the point in time at which the certain period of time begins.

6. The method according to claim 1, wherein the optically observable marker is a multicolor bar.

7. The method according to claim 6, wherein the bar includes a first triangular area with a first color and a second triangular area with a second color.

8. The method according to claim 1, which further comprises displaying the order with a second optically observable marker, if the order is classified as critical.

9. The method according to claim 1, which further comprises displaying the order with a third optically observable marker, if the order is classified as noncritical.

10. The method according to claim 1, which further comprises displaying the order with a fourth optically observable marker, if the order produces a missing component.

11. The method according to claim 1, which further comprises selecting the component from the group consisting of material, a tool, equipment and a personal resource.

12. The method according to claim 1, wherein:
the optically observable marker is a rectangle formed by a first triangular area with a first color and a second triangular area with a second color;
the first triangular area with the first color indicates a consumption of a material; and
the second triangular area with the second color indicates a production of the material.

13. The method according to claim 1, which further comprises:
displaying the order with the first optically observable marker, if the order requires a missing material;
displaying the order with a second optically observable marker, if the order can potentially require a missing material; and
displaying the order with a third optically observable marker, if the order does not require a missing component.

14. The method according to claim 1, which further comprises:
displaying the order with the first optically observable marker, if the order is classified as critical due to a request of a material during a time period in which the material is not available; and
displaying the order with a second optically observable marker, if the order is classified as sub-critical due to a request of the material during a predetermined time period before the material will not be available.

* * * * *